Oct. 28, 1941.  J. H. McLEOD  2,260,471
NONREFLECTING COATING FOR GLASS
Filed Sept. 28, 1940
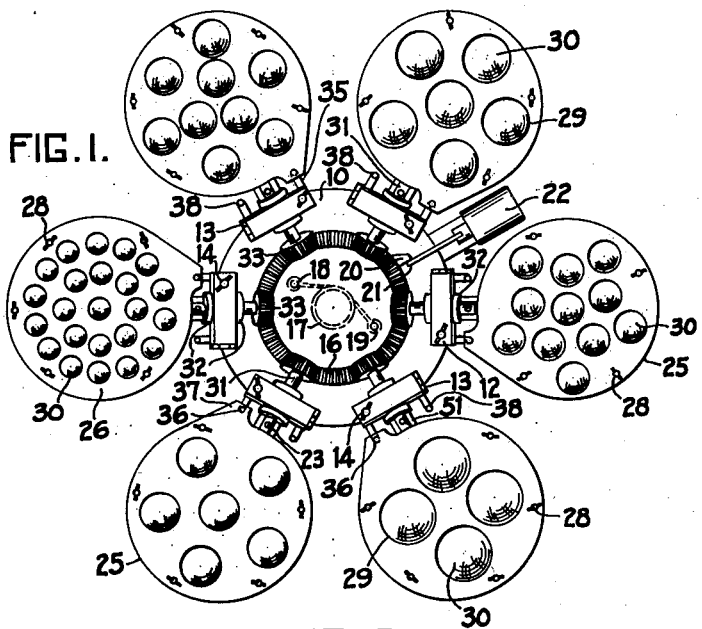
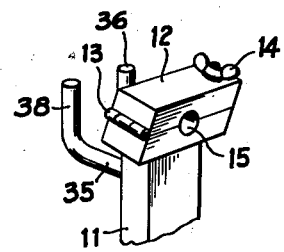
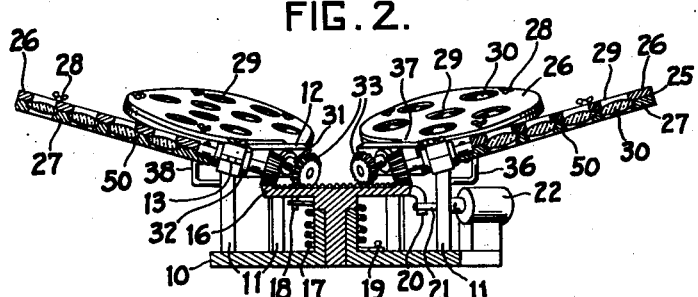
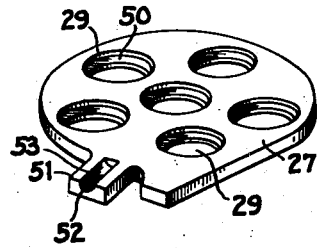
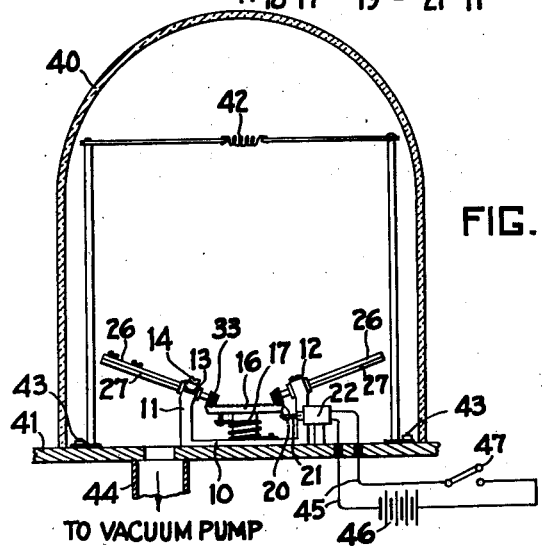
JOHN H. McLEOD
INVENTOR
BY [signature]
ATTORNEY Patented Oct. 28, 1941

2,260,471

UNITED STATES PATENT OFFICE 2,260,471

NONREFLECTING COATING FOR GLASS

John H. McLeod, Rochester, N. Y., assignor to Eastman Kodak Company, Rochester, N. Y., a corporation of New Jersey Application September 28, 1940, Serial No. 358,855

10 Claims. (Cl. 91—12.2)

This invention relates to apparatus for coating the surface of glass with interference layers to prevent Fresnel reflections.

The present invention relates to apparatus for coating the lenses according to process involving the evaporation of a fluoride supported in a vacuum by an electrically heated filament. The fluoride travels mainly in straight lines from the filament and deposits on any surface it strikes.

It is an object of the invention to provide a device for holding lenses which will permit coating them on both sides.

It is an object of the invention to provide a device for holding lenses so that the coating is uniform on both surfaces and on all the lenses coated in one batch.

It is an object of the invention to provide means for turning the lenses over without breaking the vacuum in which they are coated.

It is an object of the invention to provide means for controlling this turning over operation which means will not interfere with the vacuum.

According to the invention, the usual bell jar and filament arrangement contains one or preferably more substantially flat lens clamps, for example the sandwich type described by Lee in copending application, Serial No. 358,845 filed concurrently herewith. These clamps are rotatable about axes in their own planes and by means of stops, the rotation is limited to 180°. In the limiting positions the clamps are arranged so that the exposed surface receives a substantially uniform coating of the material evaporated from the filament. This requires that a line from the filament perpendicular to the clamp, should pass through the center of the area which is to receive the coating and also requires that this area be small compared to the distance from the filament. To insure this relationship and to insure that all of the lenses in the different clamps get the same amount of coating, the axes of rotation of the clamps are all tangential to a common sphere having the filament as its center. The word sphere is here used abstractly (as the words plane and line are often used) and does not refer to any actual object. Some means for rotating the clamps is provided and so that the rotation may be controlled from outside the bell jar without breaking the vacuum, an electrical control such as an electrical motor or spring motor with an electrical release, is provided for controlling the operation of the rotating means.

The preferred embodiment of the invention has two similarly perforated plates for holding the lens by the edges, one lens in each pair of perforations. One of each pair of plates has an axle extending radially from one edge thereof and the whole clamp is supported by a bearing engaging this axle. A gear mounted on the other end of the axle is driven by a main gear which simultaneously engages the axle gears of all of the units. The main gear is spring driven and is held against operation by a detent which is electrically releasable.

Each of the clamping units is made separately removable from the support either by disengaging the gears and removing the plates and axle from its bearing or by having the plates detachable from the axle. This permits each clamp to be loaded separately and since different size perforations are required for different area lenses, it permits the same support and driving members to be used for all sizes of lenses.

Other objects and advantages of the invention and the invention itself will be more fully understood from the following description when read in connection with the accompanying drawing in which:

Fig. 1 is a plan view of a lens holding means according to the invention.

Fig. 2 is a vertical cross section of Fig. 1.

Fig. 3 is an enlarged fragmentary detail of the apparatus shown in Figs. 1 and 2 and illustrates the bearings which support the axle.

Fig. 4 is a vertical cross section showing the apparatus of Figs. 1 and 2 mounted in a bell jar.

Fig. 5 is an enlarged view of one of the plates constituting part of a lens clamping unit.

Since the figures all show the same embodiment of the invention, they will be described together. A base 10 having upright arms 11 acts as a support for bearings 15 formed between the arms 11 and plates 12 hinged thereto at hinges 13 and fastened down by wing nuts 14. The base 10 also rotatably supports a main crown gear 16 which under the action of a spring 17 fastened to the gear at the point 18 and to the base at the point 19 rotates clockwise when viewed from above. Before loading any lens-clamping units into the bearings to engage the gear 16, this gear 16 is wound up by rotating counter-clockwise until a nose 20 on the gear 16 is held as shown in Fig. 1 by a detent 21 which detent is releasable by a solenoid 22 supported on the base 10.

The lenses 30 to be coated are clamped in perforations 29 in similarly perforated plates 26 and 27 which make up a clamping unit 25. The plates are clamped by wing nuts 28 screwing onto aligning pins carried by the lower plate 27. Each of the perforations in the plate 27 has a recessed or counterbored portion 50 in its inside surface to hold the individual lenses. This plate 27 is provided with a radially extending portion 51 having a groove 52 for engaging an axle 31. The plates are clamped to the axle by a screw 23 which passes through the axle and screws into a threaded hole 53 in the portion 51.

The axle 31 has two collars 32 for preventing longitudinal movement in the bearing 15. The inside end of the axle 31 is provided with a bevel gear 33 for engaging the crown gear 16.

The plate 27 is also provided with a corner 37 which is placed in contact with a stop 36 carried by an arm 35 mounted on the upright 11 when the lens clamping unit is mounted in the holder. The rotation of the clamping units 25 is thus limited by the stop 36 and a similar stop 38.

In Fig. 4 a bell jar 40 mounted on a metal base plate 41 includes in addition to the above-described apparatus, a filament 42 having electrical outlets 43 through which current may be supplied to heat the filament 42. The bell jar 40 may be evacuated through an outlet 44 in the well-known way. The lenses to be coated are mounted as described above and are placed in the bell jar as shown in Fig. 4 with the clamps 25 equidistant from the filament 42 whereby all of the lenses 30 receive the same coating. The axes of rotation 31 of the clamping units are all tangential to a common sphere having the filament 42 as its center. After one side of the lenses has received its full coating, a switch 47 is closed and by means of a power source 46 current is passed through leads 45 to actuate the solenoid 22 thus removing the detent 21 and allowing the gear 16 to rotate clockwise. This rotation continues until the portions 37 of the plates 27 come in contact with the stops 38. By having the rotation of the clamps electrically controlled, the only connection between the inside and the outside of the bell jar is the electrical leads 45 which can easily be sealed so as not to interfere with the formation of a vacuum and which also permits the turning over of the lenses to be obtained without breaking the vacuum.

The individual clamping units are made up so as to be removable either by unscrewing the machine screw 23 and removing the two plates from their axle or by opening the bearing 15 by unscrewing the wing nut 14 and removing the whole unit including the gear 33. I have found that a holder which accommodates a plurality of units at one time (six in the example illustrated) is very satisfactory and by having sets of clamps adapted for various size lenses the units can be used for various size lenses at the same time.

Having thus described the preferred embodiment of my invention in detail, I wish to point out that it is not limited to this specific structure, but is of the scope of the appended claims.

What I claim and desire to secure by Letters Patent of the United States is:

1. Apparatus for holding lenses during surface coating thereof comprising means for holding a plurality of lenses in one plane and exposed from both sides, an axle extending in said plane from one side of the lens-holding means, a bearing engaging said axle for rotatably supporting the lens holding means, stops for limiting the rotation of the lens holding means to 180°, means for rotating the lens holding means and electrical means for controlling the operation of the rotating means.

2. Apparatus according to claim 1 in which the lens holding means consists of two similarly perforated plates adapted to clamp a lens by its margins between the plates in line with each pair of perforations and means for clamping the two plates.

3. Apparatus for holding lenses during surface coating thereof comprising means for holding a plurality of lenses in one plane and exposed from both sides, an axle extending in said plane from one side of the lens holding means, a bearing engaging said axle for rotatably supporting the lens holding means, stops for limiting the rotation of the lens holding means to 180°, a gear on the end of the axle, gear means engaging the axle gear for rotating the axle and lens holding means and electrical means for controlling the operation of the rotating means.

4. Apparatus for holding lenses during surface coating thereof comprising means for holding a plurality of lenses in one plane and exposed from both sides, an axle extending in said plane from one side of the lens holding means, a bearing engaging said axle for rotatably supporting the lens holding means, stops for limiting the rotation of the lens holding means to 180°, spring driven means for rotating the lens holding means, a detent for holding the spring driven means against the force of the spring and with the lens holding means in one of the limiting positions of its rotation and electrical means for releasing the detent allowing the lens holding means to rotate under the action of the spring to the other of its limiting positions.

5. Apparatus for holding lenses during surface coating thereof comprising a support, a plurality of substantially flat lens holding units rotatably carried by the support with the axes of rotation all tangent to a common sphere, each unit being arranged to grip at least one lens by the edges with both surfaces thereof exposed, stops for limiting the rotation of each unit to 180° with the unit also tangential to said common sphere at each of the limiting positions, means carried by the support for rotating all of the units simultaneously and electrical means for controlling the operation of the rotating means.

6. Apparatus according to claim 5 in which each unit is separately removable from the support.

7. Apparatus according to claim 5 in which each unit consists of two similarly perforated plates adapted to clamp a lens by its margins between the plates in line with each pair of perforations and means for clamping the two plates.

8. Apparatus for holding lenses during surface coating thereof comprising a support, a plurality of substantially flat lens holding units rotatably carried by the support with the axes of rotation all tangent to a common sphere, each unit being arranged to grip at least one lens by the edges with both surfaces thereof exposed, stops for limiting the rotation of each unit to 180° with the unit also tangential to said common sphere at each of the limiting positions, a gear carried by each unit, a single rotating gear engaging all of the unit gears for rotating the units simultaneously and electrical means for controlling the rotation of the single gear.

9. Apparatus for holding lenses during surface coating thereof comprising a support, a plurality of substantially flat lens holding units rotatably carried by the support with the axes of rotation all tangent to a common sphere, each unit being arranged to grip at least one lens by the edges with both surfaces thereof exposed, stops for limiting the rotation of each unit to 180° with the unit also tangential to said common sphere at each of the limiting positions, spring driven means for simultaneously rotating all of the units, a detent for holding the spring driven means against the force of the spring and with each unit in one of said limiting positions, and electrical means for releasing the detent allowing the units to rotate to their other limiting positions under the action of the spring.

10. Apparatus for holding lenses during surface coating thereof by evaporation of the coating material from a hot filament comprising a container adapted to be evacuated, a filament supported in the container for holding said material, means for heating the filament, a lens holding device in the container consisting of a support, a plurality of substantially flat lens holding units rotatably carried by the support with the axes of rotation all tangent to a common sphere having its center at said filament, each unit being arranged to grip at least one lens by the edges with both surfaces thereof exposed, stops for limiting the rotation of each unit to 180° with the unit also tangential to said common sphere at each of the limiting positions, means carried by the support for rotating all of the units simultaneously and electrical means for controlling from the outside of the container, the operation of the rotating means.

JOHN H. McLEOD.